US008862420B2

(12) United States Patent
Ferran et al.

(10) Patent No.: US 8,862,420 B2
(45) Date of Patent: Oct. 14, 2014

(54) MULTI-AXIS TILT SENSOR FOR CORRECTING GRAVITATIONAL EFFECTS ON THE MEASUREMENT OF PRESSURE BY A CAPACITANCE DIAPHRAGM GAUGE

(71) Applicant: Reno Sub-Systems Canada, Incorporated, Bedford (CA)

(72) Inventors: David J. Ferran, Del Mar, CA (US); Robert J. Ferran, San Diego, CA (US)

(73) Assignee: Reno Sub-Sustems Canada Incorporated, Bedford, Nova Scotia (CA)

( * ) Notice: Subject to any disclaimer, the term of this patent is extended or adjusted under 35 U.S.C. 154(b) by 0 days.

(21) Appl. No.: 14/155,321

(22) Filed: Jan. 14, 2014

(65) Prior Publication Data

US 2014/0222363 A1 Aug. 7, 2014

Related U.S. Application Data

(60) Provisional application No. 61/761,226, filed on Feb. 5, 2013.

(51) Int. Cl.
*G01L 27/00* (2006.01)
*G01L 9/00* (2006.01)
(52) U.S. Cl.
CPC ............ *G01L 27/002* (2013.01); *G01L 9/0072* (2013.01)
USPC .......................................................... 702/98

(58) Field of Classification Search
USPC .......................................................... 702/98
See application file for complete search history.

(56) References Cited

U.S. PATENT DOCUMENTS

| 4,823,603 | A | 4/1989 | Ferran et al. |
| 5,396,803 | A | 3/1995 | Ferran |
| 5,515,711 | A * | 5/1996 | Hinkle ........................... 73/1.58 |
| 6,837,112 | B2 | 1/2005 | Ferran et al. |
| 2010/0198545 | A1 | 8/2010 | Berg et al. |
| 2011/0271764 | A1* | 11/2011 | Lee ................................. 73/718 |
| 2013/0233086 | A1 | 9/2013 | Besling et al. |

* cited by examiner

*Primary Examiner* — Tung S Lau
*Assistant Examiner* — Xiuquin Sun
(74) *Attorney, Agent, or Firm* — Jerry Turner Sewell

(57) ABSTRACT

A system and method compensate for effects of gravity on the diaphragm of a capacitance diaphragm gauge (CDG). The CDG generates a measured absolute pressure value in response to an applied absolute pressure on an input of the CDG. The CDG is subjected to a variable orientation of the CDG with respect to the earth's surface that can cause inaccurate pressure measurements. A pressure measuring circuit generates a measured value of an applied absolute pressure provided to an input of the CDG. A tilt sensor generates at least one tilt sensor output value that is responsive to an orientation of the CDG with respect to the earth's surface. A processing system adjusts the measured absolute pressure value by a calibration factor to generate a calibrated absolute pressure value representing the applied absolute pressure, wherein the calibration factor is selected in response to the at least one tilt sensor output value.

3 Claims, 6 Drawing Sheets

MULTI-AXIS TILT SENSOR FOR CORRECTING GRAVITATIONAL EFFECTS ON THE MEASUREMENT OF PRESSURE BY A CAPACITANCE DIAPHRAGM GAUGE

RELATED APPLICATIONS

The present application claims the benefit of priority under 35 USC §119(e) to U.S. Provisional Application No. 61/761,226 filed on Feb. 5, 2013, which is incorporated by reference herein.

BACKGROUND OF THE INVENTION

1. Field of the Invention

The present invention is in the field of capacitance diaphragm gauges which measure pressure based on the deflection of a diaphragm.

2. Description of the Related Art

Absolute capacitance diaphragm gauges (CDGs) measure pressure by sensing the capacitance change associated with deflection of a diaphragm whereby one side of the diaphragm ("the Px side") is exposed to the pressure to be measured (Px) and the other side of the diaphragm is exposed to a sealed reference vacuum cavity in which an ultrahigh vacuum (e.g., less than $10^{-9}$ Torr) has been created prior to the sealing of the reference cavity.

The CDG measures capacitance between a diaphragm and one or more fixed electrodes housed in the reference vacuum cavity. When the pressure on the Px side of the diaphragm is higher than the pressure in the reference vacuum cavity, the diaphragm deflects in the direction of the fixed electrode (or electrodes), which increases the measured capacitance. As the pressure on the Px side of the diaphragm decreases, the pressure differential across the diaphragm diminishes and the diaphragm moves away from the fixed electrode (or electrodes) in the reference vacuum cavity, which reduces the measured capacitance.

As the pressure on the Px side of the diaphragm approaches the pressure in the reference vacuum cavity, the pressure differential across the diaphragm becomes sufficiently small as to be considered as the "zero point" for the CDG. This fixed zero point is established during the calibration of the CDG and is used as a reference in subsequent pressure measurements.

CDGs are commonly used to the measure pressure in vacuum chambers in which thin or thick films of material are deposited on a substrate. One common example of usage is to measure pressure during the deposition of materials onto the surface of silicon wafers during the fabrication of semiconductor devices. CDGs are quite useful in vacuum deposition processes that utilize multiple gasses because capacitance diaphragm gauges are highly accurate and are able to measure absolute pressure independent of gas composition.

The accuracy of the measurement of pressure by a CDG can be negatively impacted by several factors, one of which is a change in the orientation of the CDG with respect to a conventional orientation in which an X-Y plane of the CDG is parallel to the surface of the earth and the Z axis of the CDG is normal to the surface of the earth. In particular, a CDG is conventionally calibrated with the CDG in a known orientation. When the CDG is installed in a system with the CDG in a different orientation, the gravitational effects on the diaphragm may cause the diaphragm to have a biased deflection toward or away from the fixed electrode within the CDG. This biased deflection can result in an offset in the pressure reading.

The magnitude of the error caused by the misalignment of the axis of the CDG diaphragm with that of gravitational forces differs significantly for different mounting orientations. Historically, the gravitational effects have been crudely dealt with by the user re-zeroing the CDG after installation in the user's system. However, this is not a satisfactory solution for many users who want to be able to replace an existing CDG with a new CDG without having to recalibrate each time a CDG is replaced.

SUMMARY OF THE INVENTION

A need exists for an apparatus and a method for compensating for errors due to changes in the orientation of a capacitance diaphragm gauge. The system disclosed and claimed herein is responsive to the need.

A system and method disclosed herein compensate for effects of gravity on the diaphragm of the CDG that may cause inaccurate pressure measurements. The CDG generates a measured absolute pressure value in response to an applied absolute pressure on an input of the CDG. A pressure measuring circuit generates a measured value of an applied absolute pressure provided to an input of the CDG. A tilt sensor generates at least one tilt sensor output value that is responsive to an orientation of the CDG with respect to the earth's surface. A processing system adjusts the measured absolute pressure value by a calibration factor to generate a calibrated absolute pressure value representing the applied absolute pressure, wherein the calibration factor is selected in response to the at least one tilt sensor output value.

An aspect in accordance with embodiments disclosed herein is a method for compensating for effects of gravity on the diaphragm of a capacitance diaphragm gauge (CDG) that measures an absolute pressure applied to an input of the CDG, wherein the CDG is positionable with the diaphragm in differing orientations with respect to the earth's surface. The method comprises applying an applied absolute pressure to the input of the CDG, and generating a measured pressure value responsive to the applied absolute pressure. The method further comprises determining an orientation of the CDG with respect to the earth's surface using a tilt sensor coupled to the CDG, and adjusting the measured pressure value by a calibration factor determined by the orientation of the CDG to generate a calibrated pressure value that corresponds to the applied absolute pressure. In certain embodiments of the method, the measured pressure value is a first digital value, the calibration factor is a second digital value, and the calibrated pressure value is a third digital value. In certain embodiments of the method, the calibration factor is determined by applying a known absolute pressure to the input of the CDG, and varying the orientation of the CDG with respect to the earth's surface to a plurality of different orientations while monitoring the measured pressure value at each of a plurality of different orientations. A difference between the measured absolute pressure and the known absolute pressure is determined at each of the plurality of different orientations. A respective calibration factor for each of the plurality of different orientations is generated based on the difference between the measured absolute pressure and the known absolute pressure at each respective orientation. In certain embodiments of the method, each respective calibration factor is stored in a lookup table indexed by the plurality of different orientations. In certain embodiments of the method, the calibration factors at each of the plurality of different orientations are used to produce a calibration equation that generates a calibration factor in response to a determined orientation of the CDG.

Another aspect in accordance with embodiments disclosed herein is a system that compensates for effects of gravity on the diaphragm of a capacitance diaphragm gauge (CDG) that generates a measured absolute pressure value in response to an applied absolute pressure on an input of the CDG, wherein the CDG is subjected to a variable orientation of the CDG with respect to the earth's surface. The system comprises a pressure measuring circuit that generates a measured value of an applied absolute pressure provided to an input of the CDG. The system further comprises a tilt sensor that generates at least one tilt sensor output value that is responsive to an orientation of the CDG with respect to the earth's surface. The system further comprises a processing system that adjusts the measured absolute pressure value by a calibration factor to generate a calibrated absolute pressure value representing the applied absolute pressure. The calibration factor is selected in response to the at least one tilt sensor output value. In certain embodiments of the system, the measured absolute pressure value is a first digital value, the calibration factor is a second digital value, and the calibrated absolute pressure value is a third digital value. In certain embodiments of the system, the CDG generates an analog signal that represents the measured value of the absolute pressure, and the system further includes an analog-to-digital converter that converts the analog signal to the first digital value. In certain embodiments of the system, the processing system obtains the calibration factor from a lookup table indexed by the at least one tilt sensor output value. In certain embodiments of the system, the processing system calculates the calibration factor using a calibration equation wherein the at least one tilt sensor output value is an input variable to the calibration equation.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The improvements to capacitance diaphragms are disclosed herein with respect to exemplary embodiments of a system and a method. The embodiments are disclosed for illustration of the system and the method and are not limiting except as defined in the appended claims. Although the following description is directed to a particular embodiment of a capacitance diaphragm gauge, it should be understood that the disclosed system and method can be applied to other embodiments of capacitance diaphragm gauges.

Figure 1:
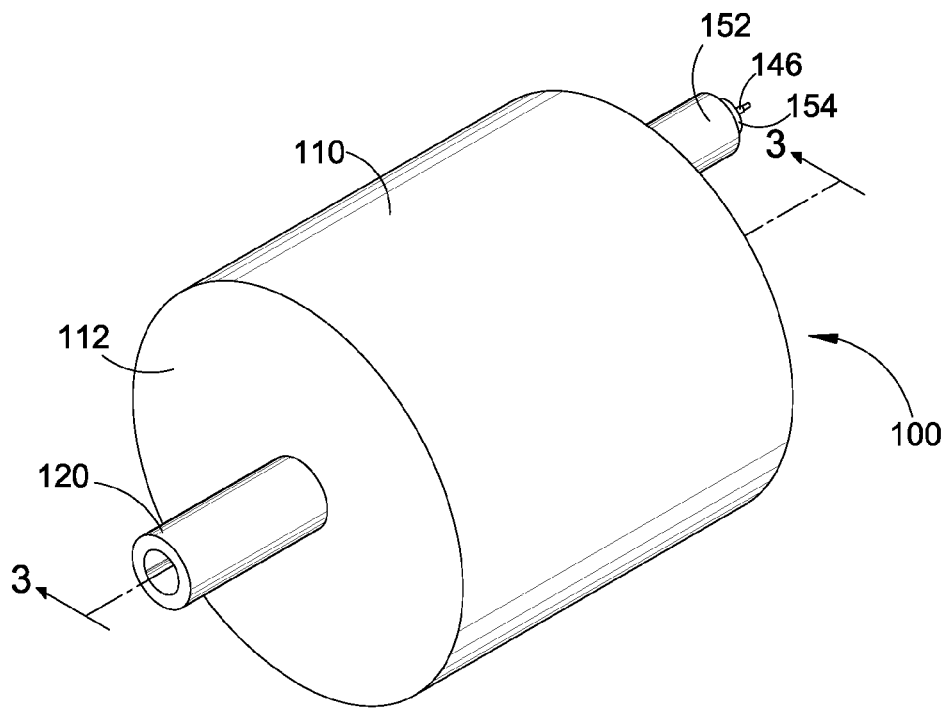
FIG. 1 illustrates a front perspective view of an exemplary capacitance diaphragm gauge (CDG), which is installable into a pneumatic system (not shown) to measure the pressure within the system.
Figure 2:
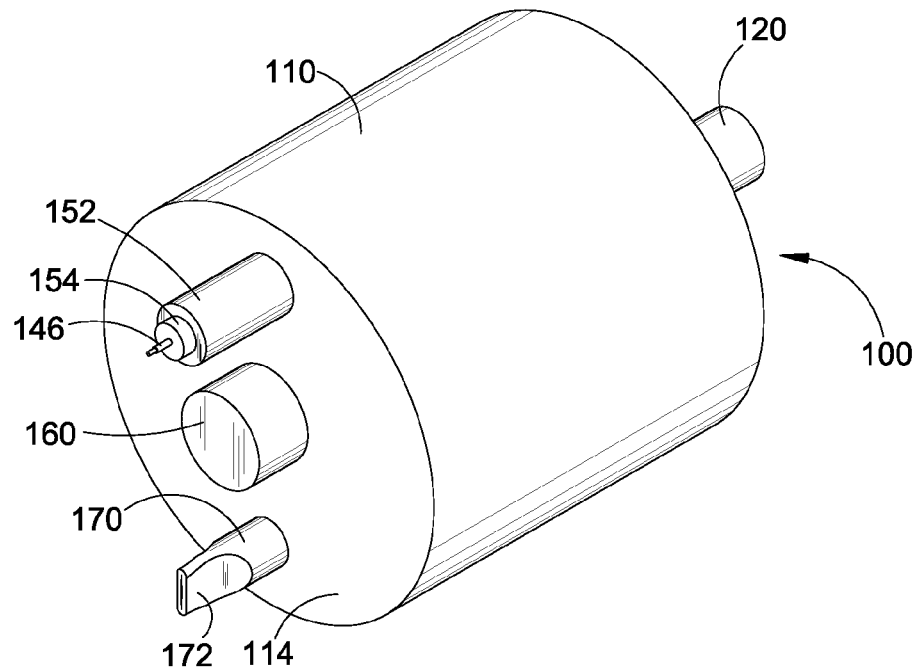
FIG. 2 illustrates a rear perspective view of the CDG of FIG. 1 which is rotated 180° from the view in FIG. 1.
Figure 3:
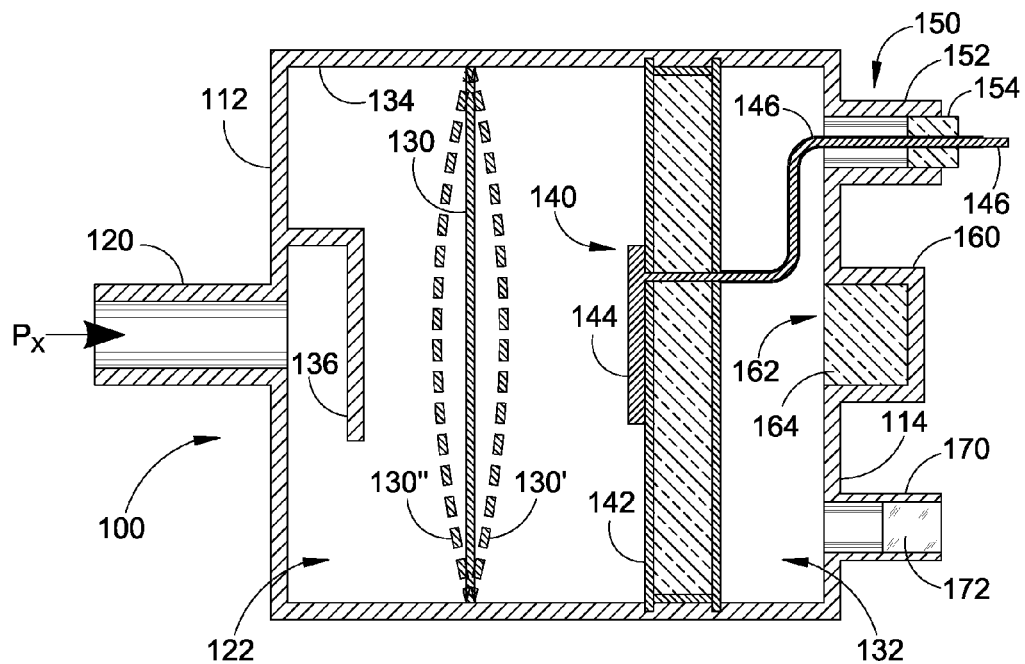
FIG. 3 illustrates a cross-sectional view of the CDG taken along the line 3-3 in FIG. 1, wherein the diaphragm appears undeflected in solid lines and appears in first and second deflected positions in dashed lines, and wherein a coordinate system is illustrated by X, Y and Z axes (the Y axis represented as a dot to indicate that the axis is normal to the drawing figure)

FIG. 1 illustrates a front perspective view of an exemplary capacitance diaphragm gauge (CDG) 100, which is installable into a pneumatic system (not shown) to measure the pressure within the system. In particular, the CDG is used to measure very low pressures resulting from evacuation of the pneumatic system. FIG. 2 illustrates a rear perspective view of the CDG of FIG. 1 which is rotated 180° from the view in FIG. 1. FIG. 3 illustrates a cross-sectional view of the CDG taken along the line 3-3 in FIG. 1.

In the illustrated embodiment, the CDG 100 comprises a hollow, generally cylindrical body structure 110, which extends between a first end surface 112 (FIG. 1) and a second end surface 114 (FIG. 2). A first cylindrical tube 120 extends from the first end surface. The first cylindrical tube provides pneumatic access to a first inner cavity 122 (FIG. 3) of the CDG. The first cylindrical tube is connectable to the pneumatic system (not shown) to allow the pressure of the system to be applied to the first inner cavity.

As shown in FIG. 2, a diaphragm 130 within the cylindrical body structure 110 separates the first inner cavity 122 from a second inner cavity 132. The diaphragm is sealed around its peripheral edges with respect to an inner surface 134 of the cylindrical body structure so that the first inner cavity is pneumatically isolated from the second inner cavity by the diaphragm. The diaphragm is also electrically connected to the cylindrical body structure, which is electrically connected to a ground reference, as discussed below.

In certain embodiments, the diaphragm 130 comprises Inconel 750 or another suitable material. In certain embodiments, the diaphragm has a thickness that can range from approximately 0.001 inch (0.025 mm) to approximately 0.015 inch (0.38 mm). The first inner cavity 122 also includes a baffle 136 that is positioned between the diaphragm and the first cylindrical tube 120. The baffle reduces the deposition of contaminants onto the surface of the diaphragm that faces the first inner cavity.

An electrode assembly 140 is positioned within the second inner cavity 132 between the diaphragm 130 and the second end surface 114. The electrode assembly comprises a mounting structure 142, which is secured to the inner surface 134 of the cylindrical body structure 110. The mounting structure of the electrode assembly is not sealed around the peripheral edges. Accordingly, both sides of the electrode assembly are at the same pressure within the second inner cavity. At least one electrode 144 is mounted on one side of the electrode assembly mounting structure. In particular, the electrode is mounted on the side of the mounting structure that faces the diaphragm. The electrode is electrically connected through the mounting structure. A conductor 146 extends from the mounting structure to a port 150 that extends through the second end surface 114 of the cylindrical body structure 110. The port 150 includes a second cylindrical tube 152 that extends outwardly from the second end surface. The conductor extends beyond the end of the second cylindrical tube. The conductor extends through a plug 154 that hermetically seals the second cylindrical tube around the conductor.

Although described herein with respect to one electrode on the electrode assembly, one skilled in the art will appreciate that the electrode assembly may include more than one electrode. See, for example, U.S. Pat. No. 4,823,603 to Ferran et al., which discloses two concentric fixed electrodes. U.S. Pat. No. 4,823,603 is incorporated herein by reference.

In the illustrated embodiment, a central portion 160 of the second end surface 114 extends outwardly to form an extended cavity portion 162 of the second inner cavity 132. The extended portion of the second inner cavity houses a getter 164. The getter functions in a conventional manner to remove small amounts of gas that may be released by the inner surface of the second inner cavity.

A third cylindrical tube 170 extends from the second end surface 114 of the cylindrical body structure 110. Initially, the entire length of the third cylindrical tube is uniformly cylindrical. The third cylindrical tube is connected to a vacuum evacuation system (not shown) to evacuate the gases from the second inner cavity 132 to create a desired low pressure within the second inner cavity. After the evacuation process is completed, an end portion 172 of the third cylindrical tube is crimped as shown in FIG. 1 to seal the second inner cavity to maintain the evacuated condition of the second inner cavity.

As illustrated in the cross-sectional view of FIG. 3, the diaphragm 130 is a thin metallic plate that separates the first inner cavity 122 from the second inner cavity 132. As discussed above, the second inner cavity is evacuated so that the absolute pressure within the second inner cavity is very low (e.g., approximately $10^{-9}$ Torr). The pressure within the first inner cavity is determined by the pressure Px of the system (not shown) to which the first cylindrical tube 120 is connected. When the pressure within the first inner cavity is substantially equal to the pressure within the second inner cavity, the diaphragm will not be deflected and will maintain the substantially flat shape shown by the solid cross-hatched profile (labeled as 130 in FIG. 3). If the pressure Px on the system side of the diaphragm (i.e., the pressure in the first inner cavity) exceeds the pressure in the second inner cavity, the center of the diaphragm will be deflected toward the second inner cavity and the diaphragm will bow into the second inner cavity as illustrated by a first dashed cross-hatched profile 130' in FIG. 3. If the pressure Px on the system side of the diaphragm is less than the pressure in the second inner cavity, the center of the diaphragm will be deflected toward to the first inner cavity and the diaphragm will bow into the first inner cavity as illustrated by a second dashed cross-hatched profile 130" in FIG. 3. In each case, the amount of the deflection will be determined by the pressure differential between the first and second inner cavities. The amount of deflection is also determined in part by the material properties of the diaphragm (e.g., the stiffness of the diaphragm).

As is well known in the art, the diaphragm 130 forms a first, movable plate of a variable capacitor. The electrode 144 on the electrode support structure 142 forms a second, fixed plate of the variable capacitor. When the diaphragm 130 is in the undeflected initial state, the capacitance of the variable capacitor has a first (initial) value determined by the initial distance between the diaphragm and the electrode. When the pressure Px increases, the diaphragm is deflected toward the second inner cavity and thus toward the fixed electrode as illustrated by the first dashed cross-hatched profile 130'. The deflection reduces the distance between the diaphragm and the electrode, which increases the capacitance of the variable capacitor. When the pressure Px decreases, the diaphragm is deflected toward the first inner cavity and thus away from the fixed electrode as illustrated by the second dashed cross-hatched profile 130". The deflection increases the distance between the diaphragm and the electrode, which decreases the capacitance of the variable capacitor. As discussed below, the capacitance is monitored and the increases and decreases in capacitance are used to determine corresponding increases and decreases in the system pressure Px. The CDG is initially calibrated by monitoring the changes in capacitance as a plurality of known values of the pressure Px are applied to the CDG.

Figure 4:
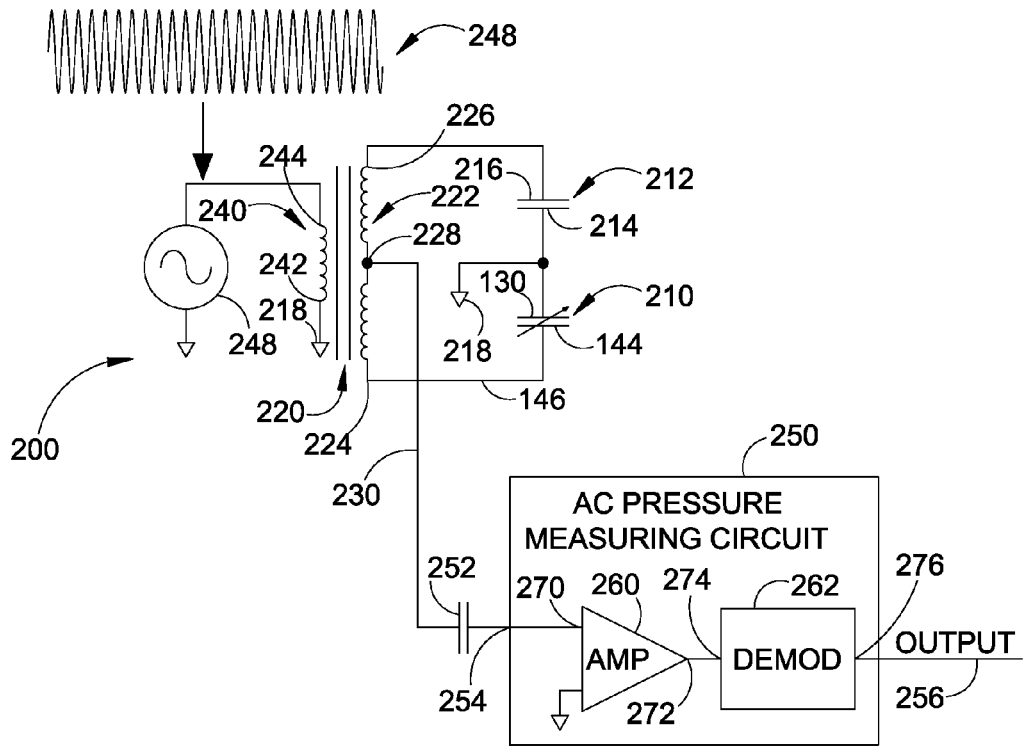
FIG. 4 illustrates a basic pressure monitoring system that monitors that the capacitance of the variable capacitor formed by the diaphragm and the fixed electrode of FIG. 3 to determine the deflection of the capacitor and thereby determine the pressure applied to the diaphragm.

FIG. 4 illustrates a simplified exemplary system 200 for monitoring the capacitance of the variable capacitor formed by the diaphragm 130 and the fixed electrode 144 of FIG. 3. The system comprises a first capacitor 210 and a second capacitor 212. The first capacitor comprises the variable capacitor formed by the diaphragm and the fixed electrode. Accordingly, a first electrode (the diaphragm) of the first capacitor is identified with the reference number 130, and a second electrode (the fixed electrode) of the first capacitor is identified with the reference number 144. The second capacitor is a conventional fixed capacitor. The second capacitor has a first electrode 214 and a second electrode 216.

The first electrode 130 of the first capacitor 210 and the first electrode 214 of the second capacitor 212 are connected to a ground reference 218. The second electrode 144 of the first capacitor is connected to a first terminal 224 of a center-tapped output (secondary) winding 222 of a transformer 220. The second electrode 216 of the second capacitor is connected to a second terminal 226 of the output winding of the transformer. A center-tap terminal 228 of the output winding of the transformer provides a signal output on a line 230.

In the illustrated embodiment, the first electrode (diaphragm) 130 of the first (variable) capacitor 210 is mechanically and electrically connected to the cylindrical body structure 110. The cylindrical body structure is electrically connected to the ground reference 218 when installed in the system having the pressure to be measured, thus providing the electrical connection of the diaphragm to the ground reference. The second electrode 144 of the first (variable) capacitor is connected to the second terminal of the transformer via the conductor 146 of FIG. 3.

In the illustrated embodiment, the capacitance of the second capacitor 212 is fixed. The capacitance of the second (fixed) capacitor is selected to be approximately equal to the initial capacitance between the diaphragm 130 and the fixed electrode 144 (e.g., the initial capacitance of the first (variable) capacitor 210) when the system pressure Px in the first inner cavity 122 is approximately equal to the pressure in the second inner cavity 132 as discussed above with respect to FIG. 3.

The transformer 220 has an input (primary) winding 240 having a first terminal 242 and a second terminal 244. The first terminal is connected to the ground reference 218. The second terminal is connected to a high frequency signal source 246 operating, for example, at a frequency of approximately 50 kilohertz as represented by an AC waveform 248.

The electrical conductor 230 connects the center tap 228 of the output winding 222 of the transformer 220 to an input 254 of an AC pressure measuring circuit 250 via an AC coupling capacitor 252. The AC pressure measuring circuit provides an output signal (OUTPUT) on an output signal line 256.

In the illustrated embodiment, the AC pressure measuring circuit 250 comprises an amplifier 260 and a demodulator 262. The signal on the center tap 228 of the output winding 222 of the transformer 220 is applied to an input 270 of the amplifier via the AC coupling capacitor 252. The amplifier preferably has a very high input impedance so that substantially zero current flows into the input of the amplifier. An output 272 of the amplifier provides an amplified output signal to an input 274 of the demodulator. An output 276 of the demodulator provides the output signal on the output signal line 256. The output signal is responsive to the variations in the capacitance of the first (variable) capacitor 210. Accordingly, the output signal varies in response to changes in the system pressure Px.

The signal generated by the high frequency signal source 250 is applied to the input (primary) winding 240 of the transformer 220. The applied signal is coupled to the secondary winding 222 and induces a high frequency voltage across the secondary winding. The induced voltage is applied across the series connection of the first (variable) capacitor 210 and the second (fixed) capacitor 212. The voltage across each capacitor is inversely proportional to the respective capacitance of the capacitor. Since the capacitance of the second (fixed) capacitor is substantially constant, the voltage across the first (variable) capacitor varies in accordance with the deflection of the diaphragm 130 caused by differential pressure across the diaphragm between the first inner cavity 122 and the second inner cavity 132 of the CDG 100. Because one electrode of each of each capacitor is electrically connected to the ground reference 218, a difference in the voltages across the two capacitors appears as a voltage differential across the output winding between the first input terminal 224 and the second input terminal 226 of the output winding of the transformer.

The voltage differential across the output winding 222 of the transformer 220 causes a voltage to appear on the center tap 228 of the output winding that is referenced to the ground reference 218 and that is proportional to the differences in the capacitance between the first (variable) capacitor 210 and the second (fixed) capacitor 212.

The voltage on the center tap 228 of the output winding 222 of the transformer 220 is applied via the conductor 230 and the AC coupling capacitor 252 to the input 270 of the amplifier 260. The amplifier amplifies the center tap voltage and provides the amplified signal as an output signal on the output 272. The output signal from the amplifier is a time-varying signal at the frequency of the signal source 250 with an amplitude that is proportional to the difference in capacitance of the first (variable) capacitor 210, which varies in response to changes in the pressure differential across the diaphragm 130. Accordingly, the amplitude of the time-varying signal output of the amplifier changes in response to changes in the pressure differential across the diaphragm.

The time-varying signal generated by the amplifier 260 is demodulated by the demodulator 262 in a conventional manner to provide the output signal on the output signal line 256 having a DC voltage level corresponding to the pressure differential across the diaphragm 130. The AC pressure measuring circuit is calibrated to equate the variations in the AC voltage to the absolute pressure (Px) applied to the diaphragm. In one embodiment, the demodulator comprises a synchronous demodulator known to the art.

Figure 5:
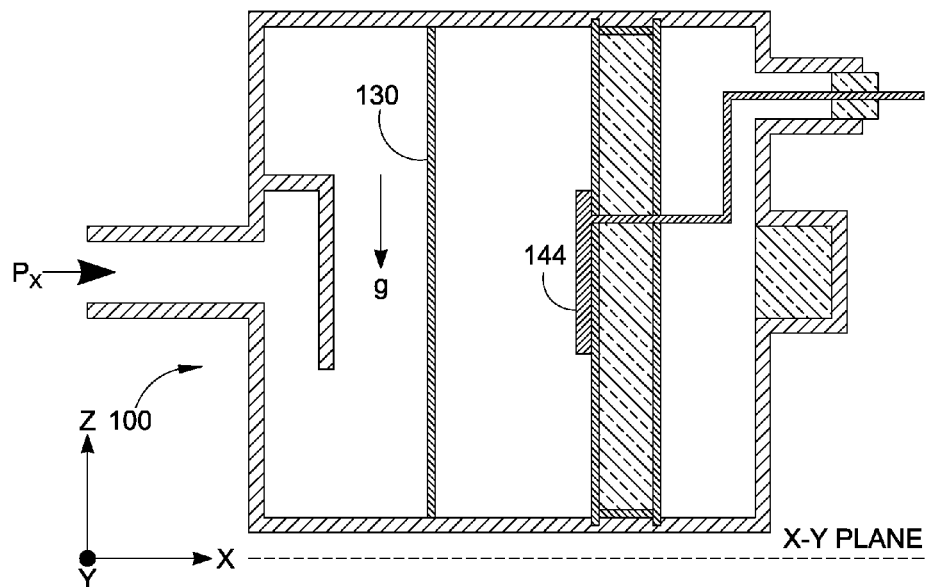
FIG. 5 illustrates the cross-sectional view of the CDG in FIG. 3 with X, Y and Z axes superimposed on the figure to provide a coordinate system to assist in describing the effects of spatial orientation on pressure measurements.

FIG. 5 illustrates the cross-sectional view of the CDG 100 in FIG. 3 with an X axis, a Y axis and a Z axis superimposed on the figure to provide a coordinate system. The X axis and the Z axis are represented as arrows. The Y axis is perpendicular to the X axis and to the Y axis and is therefore perpendicular to the plane of the drawing. In FIG. 5, the Y axis is represented as a dot to indicate that the Y axis extends outwardly from the drawing. In FIG. 5, the CDG is oriented with the diaphragm 130 positioned in the Y-Z plane. When the X-Y plane defined by the X axis and the Y axis is assumed to be horizontal to the surface of the earth, the Z axis is normal to the surface of the earth. Accordingly, the effect of gravity, represented by an arrow identified by the letter "g," is aligned with the Z axis and is parallel to the surface of the diaphragm. In this initial orientation, the effect of gravity does not cause deflection of the diaphragm either toward the fixed electrode 144 or away from the fixed electrode.

Figure 6:
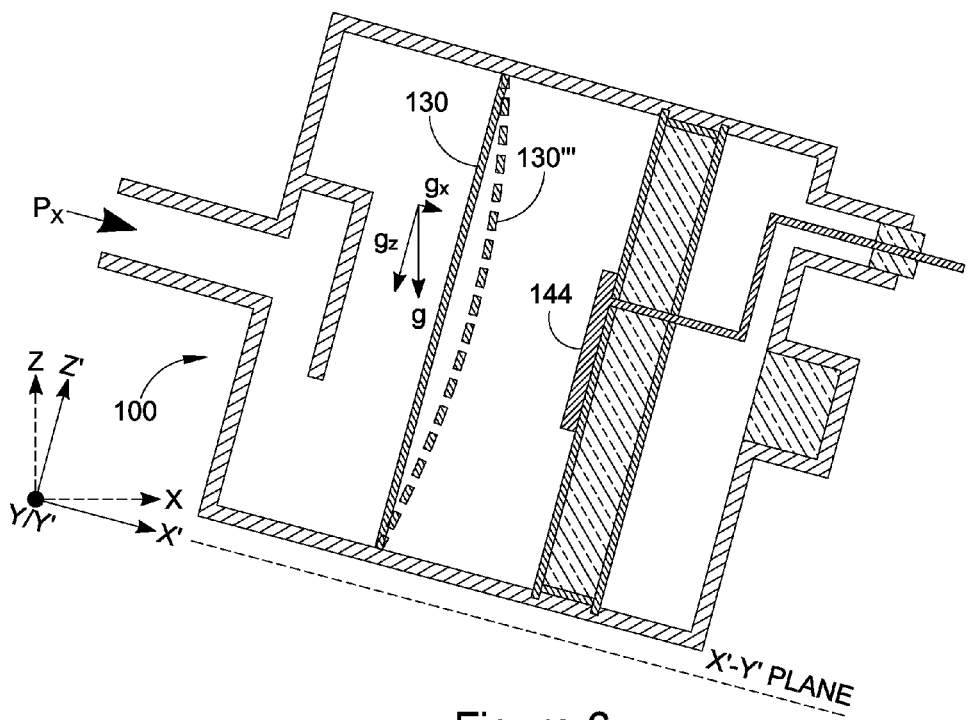
FIG. 6 illustrates the cross-sectional view of the CDG in FIG. 5 wherein the CDG is tilted (rotated) about the Y axis to cause the gravitational force (g) to be at an angle with respect to the plane of diaphragm.

FIG. 6 illustrates the cross-sectional view of the CDG 100 in FIG. 5 wherein the CDG 100 is tilted (rotated) about the Y axis to cause the X axis and the Z axis to be tilted to the positions represented by an X' axis and a Z' axis, respectively, to cause the CDG to be positioned in an X', Y', Z' coordinate system. It should be understood that the CDG can also be rotated about the X axis to cause the Y axis and Z axis to be tilted. To simplify the illustration in FIG. 6, the CDG is only rotated about the Y axis. Accordingly, the Y' axis is shown as being superimposed on the Y axis. In response to the rotation, the gravitational force (g) in FIG. 6 is illustrated to be at an angle (e.g., approximately 15 degrees) with respect to the plane of diaphragm 130. Thus, the effect of gravity has a force vector with one component ($g_x$) in the direction of the X' axis and another component ($g_z$) in the direction of the Z' axis. The component $g_x$ of the gravitational force vector tends to cause the diaphragm to be deflected by a small amount toward the fixed electrode 144 as illustrated by a deflected diaphragm 130''' shown in dashed lines. The deflection caused by the tilt is greatly exaggerated in FIG. 6 for purposes of illustration. If the CDG were to be tilted in the opposite angular direction about the Y axis, the diaphragm would be deflected by a small amount away from the fixed electrode. It should be understood that rotation of the CDG about the X axis to cause the Y axis and the Z axis to be tilted will not affect the diaphragm because the force vector remains parallel to the plane of the diaphragm.

As discussed above, the accuracy of the measurement of pressure by the CDG 100 can be negatively impacted by the deflection of the diaphragm 130 resulting from a change in the orientation of the CDG. In particular, if the CDG is calibrated when the CDG is in the unrotated position shown in FIG. 5, the calibration will no longer be accurate when the CDG is rotated to the orientation shown in FIG. 6. Although the effect of the gravitational force on the surface of the diaphragm may be small, the effect may be sufficient to affect the accuracy of the pressure reading, particularly when the deflection caused by the absolute pressure (Px) is small.

Figure 7:
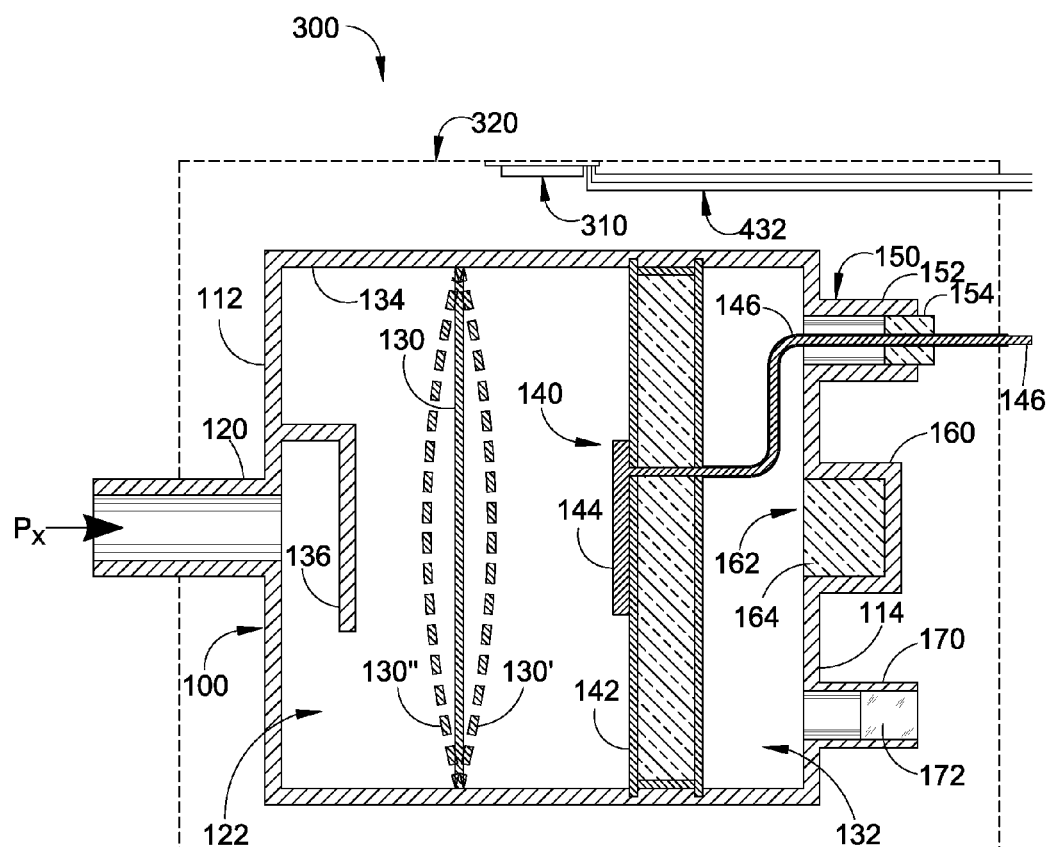
FIG. 7 illustrates a cross-sectional view of the CDG corresponding to the view of FIG. 3 that further includes a tilt sensor.
Figure 8:
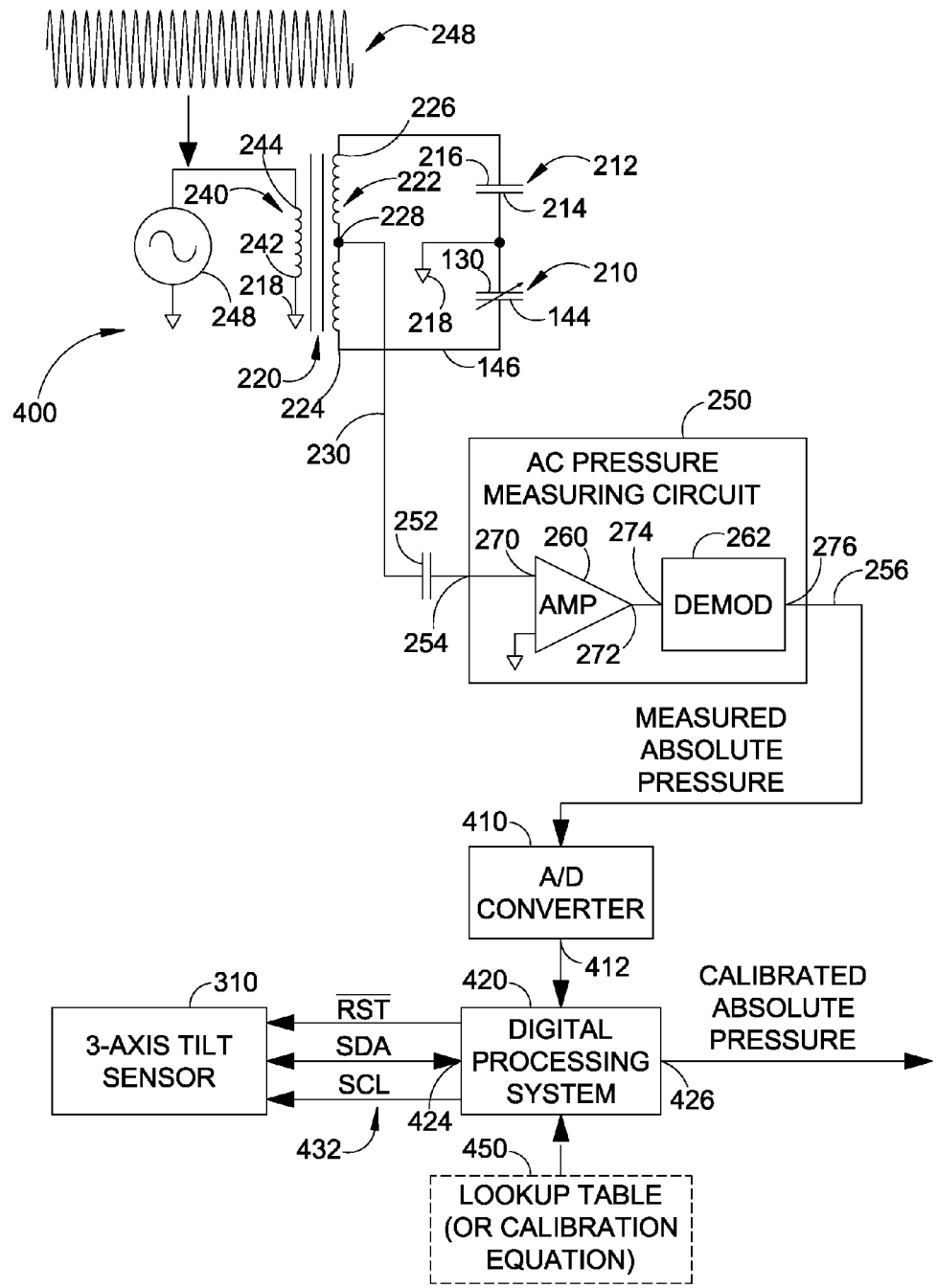
FIG. 8 illustrates an improved pressure monitoring system that compensates for the effects of changes in the orientation of the CDG.

The foregoing problems with the gravitational effects on the accuracy of a CDG sensor are solved by the CDG system 300 illustrated in FIGS. 7 and 8. The CDG system in FIG. 7 includes the CDG 100 shown in FIGS. 1-6 and further includes a multi-axis tilt sensor 310. Tilt sensors are commercially available from a number of sources. The tilt sensor is mounted so that the tilt sensor has an orientation that varies when the orientation of the CDG is varied. As illustrated in FIG. 7, the tilt sensor is mounted in a CDG package 320 that surrounds the CDG sensor body so that the tilt sensor is in a fixed spatial relationship with the CDG sensor body. Thus, when the CDG sensor body is tilted with respect to the axes of the CDG sensor body, the tilt sensor is also tilted by corresponding angles with respect to the axes of the accelerometer. In the illustrated embodiment, the tilt sensor is displaced from the CDG sensor body to thermally isolate the tilt sensor from the temperature of the CDG sensor body, which may be increased because of hot gases that enter the first inner cavity 122.

In the illustrated embodiment, the tilt sensor 310 comprises a Kionix tri-axis accelerometer, such as, for example, the Kionix KX022 three-axis accelerometer, which is commercially available from Kionix Inc., 36 Thornwood Drive, Ithaca, N.Y. Appendix A provides a detailed specification sheet for the Kionix KX022. Further information regarding the operation of the tri-axis accelerometer is presented in the attached Appendix B, which is an application note entitled "AN 005 Tilt-Sensing with Kionix MEMS Accelerometers." The information in Appendix A and the information in Appendix B are incorporated by reference in this application.

As described in Appendix A, the KX022 accelerometer (tilt sensor 310) is accessible via either a conventional Inter-Integrated Circuit (I2C) bus or a conventional Serial Peripheral Interface (SPI) synchronous serial interface to selectively retrieve digital values representing the orientation of the accelerometer with respect to a horizontal plane, which corresponds to the X axis and the Y axis of the accelerometer being oriented parallel to the ground and with the Z axis being oriented perpendicular to the horizontal plane and thus vertical with respect to ground.

As described in the application note of Appendix B, the orientations of the three axes with respect to the conventional orientation are detected within the tilt sensor 310 as changes in the gravitational force on the sensor in each axis. The digital outputs of the accelerometer represent acceleration values (e.g., gravitational effects) for each axis, which are readily converted to tilt angles for each axis in accordance with a conversion table, such as, for example, the tilt table shown in FIG. 5 of the application note.

FIG. 8 illustrates an improved pressure monitoring system 400 that includes circuitry that operates to compensate for the effects of different orientations of the CDG 100 on the measured output signal from the CDG0. The improved measurement system of FIG. 8 includes elements that are described above with respect to the system illustrated in FIG. 4. Accordingly, like elements are identified with reference numbers corresponding to the reference numbers in FIG. 4. The elements of the improved pressure monitoring system in FIG. 8 up to and including the AC pressure measuring circuit 250 are similar to the corresponding components in the previously described pressure monitoring system 200 of FIG. 4 and are not described again in detail.

In addition to the elements described above in FIG. 4, the improved pressure monitoring system 400 of FIG. 8 includes an analog-to-digital (A/D) converter 410. An input 412 of the A/D converter receives an analog value that represents the measured absolute pressure from the AC pressure measuring circuit 250. The A/D converter generates a digital value on an output 414. The digital value also represents the measured absolute pressure, which may differ from the actual absolute pressure (Px) because of the effects of the orientation of the CDG 100 on the accuracy of the CDG, as discussed above.

The digital value on the output 414 of the A/D converter 410 is provided to a first input 422 of a digital processing system 420. The digital processing system has a second input 424. The digital processing system generates a calibrated absolute pressure signal on an output 426.

In one embodiment, the digital processing system 420 comprises a microcontroller. In other embodiments, the digital processing system comprises an application specific integrated circuit (ASIC) configured to perform the function described below. In the illustrated embodiment, the digital processing system may also control the operation of the A/D converter 410 to determine when the A/D converter samples the analog signal and generates the digital value. It should be understood that the A/D converter may be incorporated into the digital processing system. In such embodiments, the analog output from the AC pressure measuring system 250 is provided to an analog input port of the digital processing system.

The second input 424 of the digital processing system 420 is connected to receive output signals from the tilt sensor 310 via a set of signal lines 432 on a conventional Inter-Integrated Circuit ($I^2C$) bus or on a conventional serial peripheral interface (SPI) bus. The $I^2C$ bus is illustrated in FIG. 8. In particular, the set of signal lines comprise a serial clock (SCL) line, a serial data (SDA) line and a reset ($\overline{RST}$) line. Power, ground and other interconnection lines to and from the tilt sensor are not shown in FIG. 8. The operation of the $I^2C$ bus is well known. One device (e.g., the digital processing system) operates as a master device to control data transfers between the devices. A second device (e.g., the tilt sensor) operates as a slave device and sends data to the master device in response to commands from the master device. In the illustrated embodiment implemented with the Kionix KX022 three-axis accelerometer described in Appendix A and Appendix B, the tilt sensor provides a plurality of digital output values that represent the orientations of the three axes of the tilt sensor with respect to the horizontal plane (e.g., the earth's surface). As described below, the digital output values are the measured accelerations along each of three axes.

The digital processing system 420 accesses the tilt sensor 310 via the digital signal bus on the signal lines 432 to obtain the digital values representing the orientation of the three axes of the tilt sensor with respect to the horizontal plane (e.g., ground). The current values are compared to the original values when the CDG was installed to determine whether the current orientation of the tilt sensor differs from the orientation at the time the CDG sensor was last calibrated and to determine the effect of any difference on the actual absolute pressure. The effect of the current orientation of the tilt sensor is determined from a lookup table 450 or by applying the current values as inputs to the formula in the alternative embodiment to obtain a correction factor for the pressure reading. The digital processing system applies the correction factor to the pressure reading, and a corrected absolute pressure is provided to the user as an output from the digital processing circuit.

When the CDG sensor assembly 320 with the CDG 100 and the tilt sensor 310 are originally manufactured, the outputs of CDG sensor are calibrated to determine the output of the CDG a zero point for the sensor at a known input pressure (Px) and a known orientation of the sensor body (e.g., with the diaphragm of the CDG oriented in a vertical plane such that the effects of gravity on the diaphragm 130). Preferably, the tilt sensor is oriented within the sensor assembly such the X axis and the Y axis are in a common horizontal plane and the Z axis is in a vertical plane when the diaphragm is oriented in this known orientation. If the values of the outputs of the tilt sensor indicate that the axes are not oriented as expected, the values of the outputs during calibration are saved as reference values representing the original orientation of the CDG assembly during calibration. Sensing of the tilt with respect to the Y axis and tilt with respect to the X axis allows the calibration process to respond to any misalignment of the axes.

During the calibration procedure, while maintaining the input pressure (Px) at a constant known value, the CDG assembly 320 is rotated to selected angular positions with respect to each axis. The value of the measured pressure at each angular position is stored. The stored values are used to develop relationships between pressure differences and the angular positions. The relationships can be stored in a lookup table. Alternatively, the relationships are processed using curve fitting or other known techniques to determine a formula that relates the angular positions to the pressure differences.

When the CDG sensor assembly 320 is initially installed, the diaphragm 130 within the CDG 100 may not be oriented in a vertical plane with respect to ground. After installation, the outputs of the tilt sensor 310 are used to determine the current orientations (tilt angles) of the three axes with respect to a horizontal plane (e.g., ground). The tilt angles of the three axes are used to determine the orientation of diaphragm with respect to the vertical plane. The orientation of the CDG sensor body is used to access the lookup table (or is applied to the input of the formula in the alternative embodiment) to provide a correction to apply to each pressure reading from the CDG sensor.

If the CDG sensor assembly is subject to movement during use, the outputs of the accelerometer will automatically adjust to any altered orientation of the axes to provide revised tilt angles to calculate the orientation and thus provide a revised correction factor to the measured output pressure.

Figure 9:
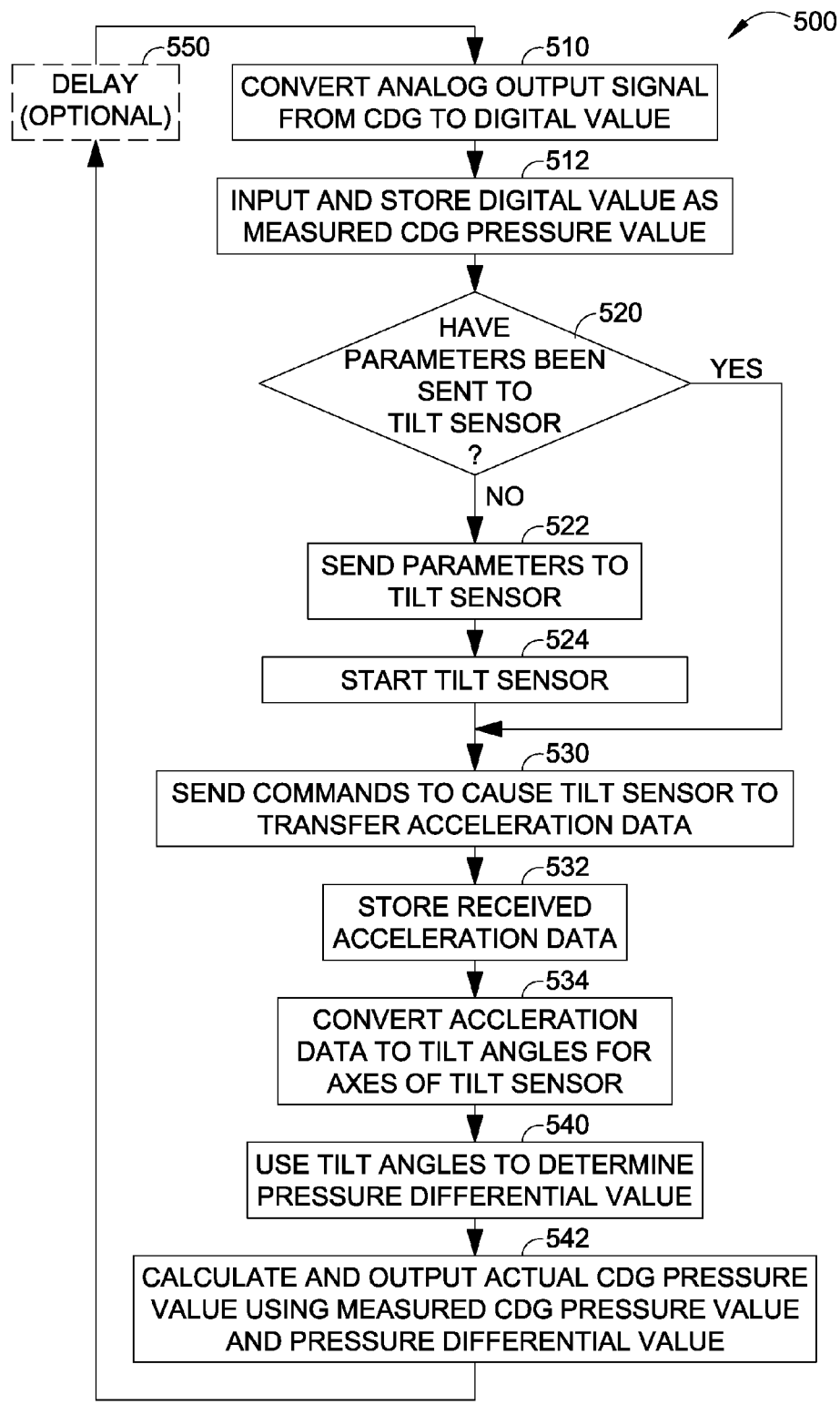
FIG. 9 illustrates a flow chart of the operation of the digital processing system of FIG. 8.

The operation of the improved pressure monitoring system 400 of FIG. 8 is illustrated by a flowchart 500 in FIG. 9, which is implemented in the digital processing system 420 of FIG. 8. The steps of the flow chart may be executed periodically or continuously in accordance with the requirements of the system. As discussed above, the digital processing system may be a microcontroller (or microprocessor), in which case, some or all of the steps of the flow chart are implemented as software instructions. The digital processing system may also be an application specific integrated circuit (ASIC), in which case, some or all of the steps are implemented by logic circuits. It should be understood that the steps may also be implemented by a combination of hardware circuits and software instructions.

The flow chart 500 in FIG. 9 begins with a step 510 in which the analog output of the AC pressure measuring circuit 250 is converted to a digital input value by the A/D converter 410. In a step 512, the digital value from the A/D converter is received by the digital processing system 420 and is stored as a measured CDG pressure value. As discussed above, in certain embodiments where the A/D converter is part of the digital processing system, the digital processing system receives the analog value directly from the AC pressure measuring circuit and converts the analog value to a digital value within the digital processing system.

The digital processing system 420 also generates appropriate command signals to the tilt sensor 310 via the I²C reset ( $\overline{RST}$ ), clock (SCL) and data (SDA) lines 432 to cause the tilt sensor to send data to the input 424 of the digital processing system. For the embodiment wherein the tilt sensor is implemented by the Kionix KX022 Tri-Axis Digital Accelerometer, the digital processing system accesses the tilt sensor at least one initial time to send parameters to the tilt sensor to set the tilt sensor to a desired mode of operation. As described in Appendix A, the tilt sensor includes a number of internal registers to store the parameters. For example, the illustrated tilt sensor may be operated to sense acceleration along each axis in a range of ±2 g, ±4 g or ±8 g. Since the tilt sensor is being used in a static environment, the range is set to ±2 g. The tilt sensor may also be operated to provide the acceleration outputs with 8-bit resolution or 14-bit resolution. In the illustrated embodiment, the tilt sensor is operated in 14-bit resolution such that the tilt sensor outputs the acceleration values as 2's complement binary data in a range from 10000000000000 (−8,192) to 11111111111111 (+8,191), wherein a value of −8,192 indicates a maximum negative value of −2.000 g, and a value of +8,192 indicates a maximum positive value of +1.999 g. Accordingly, each incremental binary value represents a change in acceleration of approximately 0.000244 g. Other parameters are also sent to the tilt sensor. For example, the rate at which the tilt sensor determines the accelerations along each axis are also controlled by parameters sent to the tilt sensor.

The first step for accessing the data from the tilt sensor 310 is thus shown as a decision step 520 in which the digital processing system 240 determines whether the operational parameters have already been sent to the tilt sensor. If the operational parameters have not already been transferred, the digital processing system performs a step 522 in which the digital processing system executes commands to transfer the operational parameters to the tilt sensor. The digital processing system then performs a step 524 in which the digital processing system starts the sensing operation of the tilt sensor. The digital processing system then proceeds to a step 530. If the operational parameters have already been sent to the tilt sensor, the digital processing system proceeds to the step 530 directly from the decision step 520.

In the step 530, the digital processing system 420 generates the appropriate command signals on the I²C lines 432 to cause the tilt sensor 310 to transfer data representing the measured accelerations along each axis of the tilt sensor. As described in Appendix A, the acceleration data are transferred as upper and lower bytes for each of the X axis, the Y axis and the Z axis. In a step 532, the digital processing system stores the acceleration data. In a step 534, the digital processing system converts the acceleration data to angular position data using the formulas disclosed in Equation 2 on page 5 of Appendix B. For example, Appendix B defines an angle φ as the angle by which the X axis is tilted from horizontal X-Y plane and defines an angle ρ as the angle by which the Y axis is tilted from the horizontal X-Y plane. Appendix B further identifies $a_x$ to be the measured value of the acceleration along the X axis, $a_y$ to be the measured value of the acceleration along the Y axis, and $a_z$ to be the measured value of the acceleration along the Z axis. It should be understood that for the initial orientation shown in FIG. 5, the acceleration along the Z axis will initially be at a maximum value of 1.000 g (at sea level) and that the accelerations along the X axis and along the Y axis will initially be zero. When the tilt sensor is tilted about the Y axis as shown in FIG. 6, the magnitude of the acceleration along the Z axis will decrease as the magnitude of the acceleration along the X axis increases. The sign of the X axis acceleration value will be determined by the direction of the tilt. In similar manner, when the tilt sensor is tilted about the X axis, the magnitude of the acceleration along the Z axis will decrease as the magnitude of the acceleration along the Y axis increases. A compound tilt about both the Y axis and the X axis will change the magnitudes of both the X axis and the Y axis as well as the Z axis. It should be understood that a component of rotation about the Z axis will not change the acceleration measurements unless the original Z axis is not perpendicular to the surface. The angles φ and ρ are calculated as follows:

$$\varphi = \arctan\left(\frac{a_x}{\sqrt{a_y^2 + a_z^2}}\right)$$

and $$\rho = \arctan\left(\frac{a_y}{\sqrt{a_x^2 + a_z^2}}\right)$$

The values of the angles φ and ρ are stored as part of the step 534 so that the values can be used as indices to the lookup table 450 that provide pressure correction factors for each incremental tilt angle of the tilt sensor 310 about the Y axis and about the X axis or used as parameters for a formula that relates the acceleration values to measured pressure differences.

In a step 540, the digital processing system 420 generates a pressure differential value (calibration factor) that represents the effect of the tilts of the three axes of the tilt sensor 310 on the pressure measured by the CDG 100. The pressure differential value may be obtained from the lookup table 450 that is indexed by the angles φ and ρ stored in the step 534. For example, during a calibration process, the lookup table may be populated by pressure differential values that are determined by applying a fixed absolute input pressure (Px) to the input of the CDG and by varying the tilt angles while monitoring the digital values representing the output of the AC pressure measuring circuit 250. The pressure differential values correspond to the differences between the monitored digital pressure values and the measured digital pressure values at each value of φ and ρ. It should be understood that if the tilt sensor is installed with the Y axis and the Z axis in a Y-Z plane precisely parallel to the planar surface of the diaphragm 130, rotation of the CDG and the tilt sensor about the X axis should have no effect on the pressure measurements since the rotation of the Y axis does not produce an acceleration component along the X axis that would cause the diaphragm to deflect. If such precise alignment can be assured, only the angle φ needs to be determined and used as an index for the lookup table.

As an alternative to a lookup table, the pressure differential value may also be determined by a calculation wherein the angles φ and ρ are used as input variables to an equation that is generated to represent the relationship between the angles φ and ρ and the pressure differential values. A parametric equation to represent the relationship between the angles φ and ρ and the pressure differential values (calibration factors) can be generated using curve fitting and other techniques is well known in the art. As with the lookup table embodiment, the equation can be generated with the angle φ as the only input variable if the surface of the diaphragm 130 is coplanar with the Y-Z plane.

In a step 542, the digital processing system 420 applies the pressure differential value from the lookup table or from the calculation to the measured CDG absolute pressure value stored in the step 512 to increase or decrease the measured CDG absolute pressure value to generate a calibrated CDG absolute pressure value. The calibrated CDG absolute pressure value corresponds to the actual absolute pressure (Px) applied to the CDG 100 via the first cylindrical tube 120 in FIG. 7. The digital processing system outputs the calibrated actual pressure value to the user (e.g., the surrounding system for which the pressure is being measured) via the output 426.

After calculating and outputting the actual pressure value, the digital processing system 420 returns to the step 510 to again input the analog input signal and to repeat the foregoing steps. The steps may be repeated continuously or the steps may be repeated on a periodic basis by having the digital processing system wait for a predetermined duration before inputting the analog input signal. The waiting is represented by an optional delay step 550; however, it should be understood that the digital processing system may be controlled by a timer set at a particular repetition rate (e.g., once per second, once per millisecond, or the like) that awakens the digital processing system or that generates an interrupt to trigger the digital processing system to exit from a wait state. The control of the timing of periodic measurement processes is well known in the art and can be accomplished in many ways.

As various changes could be made in the above constructions without departing from the scope of the invention, it is intended that all the matter contained in the above description or shown in the accompanying drawings shall be interpreted as illustrative and not in a limiting sense.

What is claimed is:

1. A method for compensating for effects of gravity on the diaphragm of a capacitance diaphragm gauge (CDG) that measures an absolute pressure applied to an input of the CDG, wherein the CDG is positionable with the diaphragm in differing orientations with respect to the earth's surface, the method comprising:
    applying an applied absolute pressure to the input of the CDG;
    generating a measured pressure value responsive to the applied absolute pressure;
    determining an orientation of the CDG with respect to the earth's surface using a tilt sensor coupled to the CDG; and
    adjusting the measured pressure value by a calibration factor determined by the orientation of the CDG to generate a calibrated pressure value that corresponds to the applied absolute pressure, wherein the calibration factor is determined by:
    applying a known absolute pressure to the input of the CDG;
    varying the orientation of the CDG with respect to the earth's surface to a plurality of different orientations while monitoring the measured pressure value at each of a plurality of different orientations;
    determining a difference between the measured absolute pressure and the known absolute pressure at each of the plurality of different orientations; and
    generating a respective calibration factor for each of the plurality of different orientations based on the difference between the measured absolute pressure and the known absolute pressure at each respective orientation.

2. The method as defined in claim 1, wherein each respective calibration factor is stored in a lookup table indexed by the plurality of different orientations.

3. The method as defined in claim 2, wherein the calibration factors at each of the plurality of different orientations are used to produce a calibration equation that generates a calibration factor in response to a determined orientation of the CDG.

* * * * *